United States Patent
Labrador et al.

(10) Patent No.: US 8,561,149 B2
(45) Date of Patent: *Oct. 15, 2013

(54) COMMUNICATIONS SERVICES MANAGEMENT USING SERVICES PROFILE

(75) Inventors: Christopher Labrador, Waterloo (CA); Brian Alexander Oliver, Fergus (CA); Douglas Michael Gisby, Rolling Meadows, IL (US); Susan Elizabeth Simon Daniels, Kitchener (CA); Brian Edward Anthony McColgan, Toronto (CA); Adrian Michael Logan, Milton (CA); Eric Allan Fritzley, Waterloo (CA); Nicholas Patrick Alfano, Stratford-Upon-Avon (GB); Richard John George, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 288 days.

This patent is subject to a terminal disclaimer.

(21) Appl. No.: 12/882,915

(22) Filed: Sep. 15, 2010

(65) Prior Publication Data

US 2012/0066736 A1 Mar. 15, 2012

(51) Int. Cl.
*H04L 29/06* (2006.01)

(52) U.S. Cl.
USPC .......... 726/4; 726/3; 726/2; 709/225

(58) Field of Classification Search
None
See application file for complete search history.

(56) References Cited

U.S. PATENT DOCUMENTS

| | | | |
|---|---|---|---|
| 5,440,624 A | 8/1995 | Schoof, II | |
| 8,264,518 B2* | 9/2012 | Khouri et al. | 348/14.08 |
| 2005/0259803 A1 | 11/2005 | Khartabil | |
| 2006/0172727 A1 | 8/2006 | Lee | |
| 2008/0019522 A1* | 1/2008 | Proctor | 380/255 |
| 2009/0204673 A1 | 8/2009 | Tian et al. | |

OTHER PUBLICATIONS

European Extended Search Report dated Mar. 7, 2011, for European Patent Application No. 10176964.4.
J. Rosenberg, A Framework for Conferencing with the Session Initiation Protocol (SIP), Feb. 2006, The Internet Society. Relevant Passage: pp. 16-18, Section 5.7 Conference Announcements and Recordings.
R.Even, Conferencing Scenarios, Jul. 2006, The Internet Society. Relevant Passages: (1) pp. 6-9, Section 3.5 Advanced Conference Features, see definition of Recorders, Whisper/Private Message; and (2) p. 14, Section 4.10 Text Sidebars.

(Continued)

*Primary Examiner* — Pramila Parthasarathy
(74) *Attorney, Agent, or Firm* — Finnegan, Henderson, Farabow, Garrett & Dunner, LLP (57) ABSTRACT

A method of managing communications services begins with a communications platform receiving a request for a communications service to be provided to a communications device by a source other than the communications platform. The communications platform determines an authorization of the communications device to receive the communications service. The authorization comprises a permission of the communications device to receive the communications service during a lifetime of a communications session maintained with the communications device. The communications network authorizes delivery of the communications service to the communications device during the lifetime of the communications session, in accordance with the authorization.

12 Claims, 8 Drawing Sheets

(56) References Cited

OTHER PUBLICATIONS

M. Barnes, et al., A Framework for Centralized Conferencing, Jun. 2008, The IETF Trust. Relevant Passages: (1) Section 9.3 Media Manipulations, see p. 31, last paragraph; (2) Section 9.4.1 Conferencing Scenarios Realizations—Internal Sidebar, see p. 34, first paragraph; (3) pp. 38-40, Section 9.6 Conferencing Scenarios Realizations—Whispering or Private Messages, see p. 41, second paragraph; (4) Section 9.4.1 Conferencing Scenarios Realizations—Internal Sidebar, see p. 36, second last paragraph; and (5) Section 9.6 Conferencing Scenarios.

Canadian Application No. 2,752,464 Office Action dated Mar. 19, 2013, 3 pgs.

* cited by examiner

COMMUNICATIONS SERVICES MANAGEMENT USING SERVICES PROFILE

FIELD

This patent application relates to a method of providing communications services at a communications network and, in particular, to a communications framework and method of managing the delivery of communications services to communications devices.

BACKGROUND

While participating in a voice conference call, one or more of the conference call participants may engage in a side bar communication session with the other conference call participants while the other conference call participants continue to participate in the conference call. To engage in a side bar communication session, the communications devices may have to disconnect from or otherwise suspend the conference call before initiating the side bar session. For instance, Lee (US 2006/172727) teaches initiating a one-to-one call between mobile stations participating in a conference call via a mobile-initiated call request. The mobile stations temporarily disconnect from the conference call for the duration of the one-to-one call, and reconnect to the conference call after the one-to-one call is terminated.

Cisco WebEx provides a conference service that makes voice and text message sessions available simultaneously via a web browser on the participants' respective communications devices. Since text messages are exchanged via a frame of each participant's web browser, the communications devices do not have to disconnect from the conference to initiate a side bar text message session.

The availability of side bar communication sessions during a conference call (whether available with or without disconnecting from the conference call) can improve productivity. However, the availability of such sessions can also limit productivity by distracting call participants from the subject matter of the conference call.

BRIEF DESCRIPTION OF THE DRAWINGS

An exemplary communications system, and method of controlling communications services will be described, with reference to the accompanying drawings, in which.

While the following description may make reference to a certain preferred implementations architecture or technology, the description provided herein is not intended to be limited to any particular operating system, communications device architecture, server architecture, or computer programming language.

DETAILED DESCRIPTION

By way of overview, in a first aspect this patent application describes a method of managing communications services at a communications network. As will be described in further detail below, the method begins with communications platform receiving a request from a communications device for a communications service to be provided to the communications device by a source other than the communications platform.

The communications platform determines an authorization of the communications device to receive the communications service. The authorization comprises a permission of the communications device to receive the communications service during a lifetime of a communications session maintained with the communications device. In accordance with the authorization, the communications platform authorizes delivery of the communications service to the communications device during the lifetime of the communications session.

In accordance with this first aspect, this patent application also describes a communications platform. The communications platform comprises a communications services framework, and a communications platform in communication with the communications services framework. The communications services framework is configured to maintain a communications session with a communications device.

The communications platform is configured to determine an authorization of the communications device to receive a communications service. The communications service is deliverable by a source other than the server. The authorization comprises a permission of the communications device to receive the communications service during a lifetime of the communications session.

The communications platform is further configured to authorize delivery of the communications service to the communications device during the lifetime of the communications session, in accordance with the authorization.

The communications network may maintain a services policy that defines a service restriction on the delivering of communications services, and the communications network may determine the authorization from the services policy. The services policy may specify at least one communications service the communications network is authorized to provide while maintaining the communications session. The services policy may specify a limitation on the scope of the at least one communications service.

The services policy may prohibit participants to the communications session from receiving the communications services for the duration of the communications session.

Alternately, the services policy may allow participants to the communications session to receive the communications services for the duration of the communications session, or may prohibit the participants from receiving any communications services for the duration of the session, except for certain specified communications services. In one implementation, the services policy only allows each participant to the communications session to communicate with the other participants of the communications session. In another implementation, the services policy only allows each participant to the communications session to communicate with other than the participants of the communications session. The services policy may require the communications services to be recorded for the duration of the communications session. The recorded communications services may comprise only the communications of the participants specified by the services policy.

In a second aspect, this patent application describes a method of managing communications services at a communications device. As will be described in further detail below, the method begins with the communications device maintaining a communications session with a server of a communications network. The communications device determines an authorization of the communications device to receive a communications service. The communications service is deliverable by a source other than the server. The authorization comprises a permission of the communications device to receive the communications service during a lifetime of the communications session.

The communications device transmits to the communications network a request for the communications service, in accordance with the authorization. In accordance with the authorization, the communications device receives the communications service while continuing to maintain the communications session.

In accordance with this second aspect, this patent application also describes a communications device. The communications device comprises a data processing system that is configured to maintain a communications session with a server of a communications network and to determine an authorization of the communications device to receive a communications service. The communications service is deliverable by a source other than the server. The authorization comprises a permission of the communications device to receive the communications service during a lifetime of the communications session.

The data processing system is further configured to transmit to the communications network a request for the communications service in accordance with the authorization.

The communications device may maintain a services policy that defines a service restriction on the receiving of communications services, and the communications device may determine the authorization from the services policy. The services policy may specify at least one communications service the communications device is authorized to receive while maintaining the communications session. The services policy may specify a limitation on the scope of the at least one communications service.

Communications System 10

Figure 1:
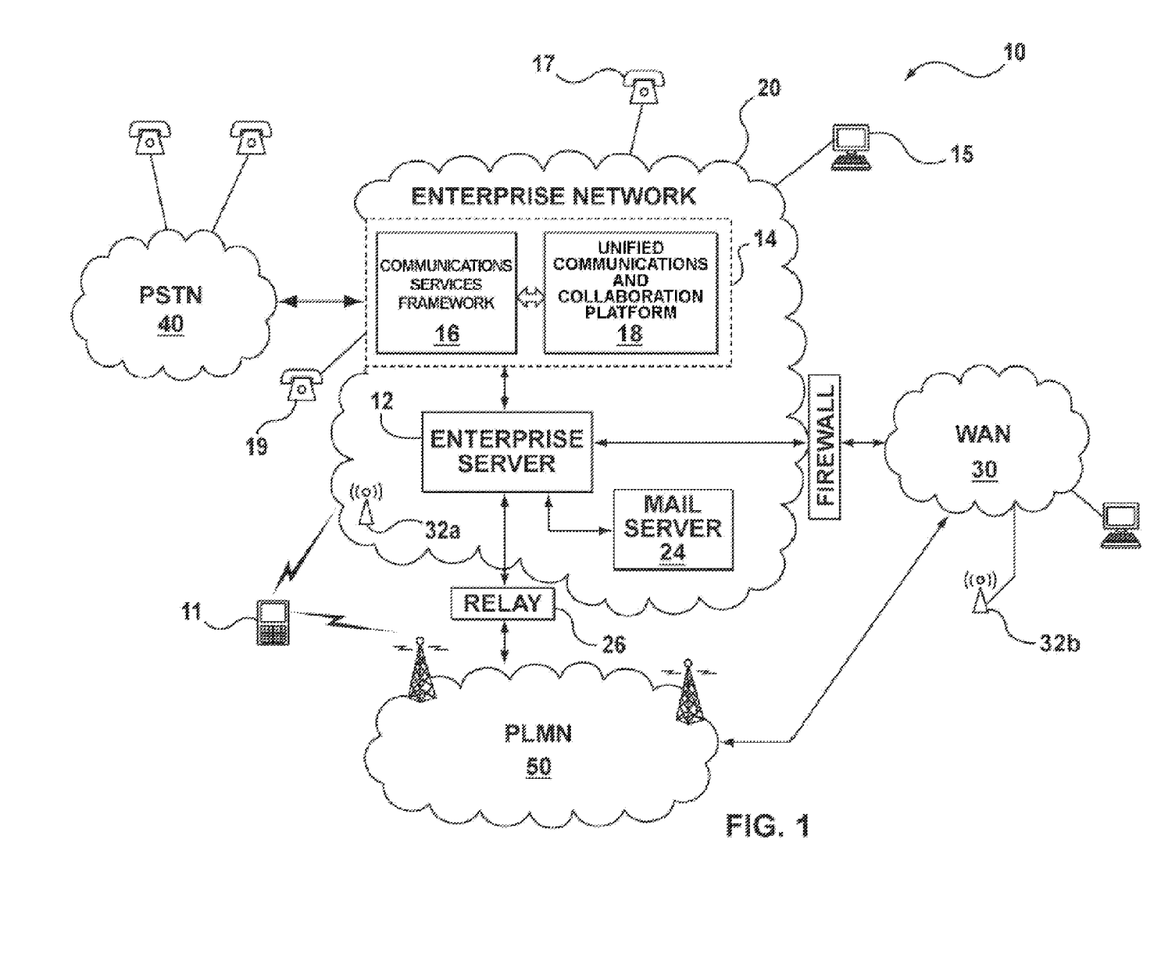
FIG. 1 is a schematic diagram of the communications system, depicting an enterprise communications platform.

Turning now to FIG. 1, there is shown a communications system, generally designated 10, that includes an enterprise network 20, a wide area network (WAN) 30, a public switched telephone network (PSTN) 40, and a public land mobile network (PLMN) 50. The enterprise network 20 may include one or more networks, which may be located in multiple geographic areas. The communications system 10 also includes one or more communications devices, such as mobile communications devices 11, personal (desktop/laptop) computers 15 and/or digital telephone sets 17.

The enterprise network 20, which is configured as a communications network, may be connected, often through a firewall, to the WAN 30 (e.g. the Internet), and may also be connected to the PSTN 40 via direct inward dialing (DID) trunks or primary rate interface (PRI) trunks. The enterprise network 20 may also communicate with the PLMN 50, which may also be referred to as a wireless wide area network or a cellular network. The connection with the PLMN 50 may be made via a relay 26, as known in the art.

The enterprise network 20 may also be connected to a wireless local area network (WLAN) 32, having one or more wireless access points, which may be configured in accordance with one of the IEEE 802.11 specifications. Other WLANs may be external to the enterprise network 20. For example, an external WLAN 32b, having one or more wireless access points, may be connected to the enterprise network 20 via the WAN 30.

Mobile Communications Device 11

Typically, each mobile communications device 11 is a two-way wireless communications device having at least voice and data communication capabilities. Depending on the exact functionality provided, the mobile communications device 11 may be configured as a data messaging device, a two-way pager, a wireless e-mail device, a cellular telephone with data messaging capabilities, a wireless Internet appliance, a portable computer, or a data communication device, as examples.

One or more of the mobile communications devices 11 may be configured for cellular communication with the PLMN 50. The PLMN 50 and mobile communications devices 11 may be configured to operate in compliance with any of a number of wireless protocols, including GSM, GPRS, CDMA, EDGE, UMTS, EvDO, HSPA, and 3GPP. One or more of the mobile communications devices may be configured for WiFi communications with one or more of the WLANs 32. Alternately, the mobile communications devices 11 may comprise dual-mode devices capable of both cellular and WiFi communications.

Figure 2:
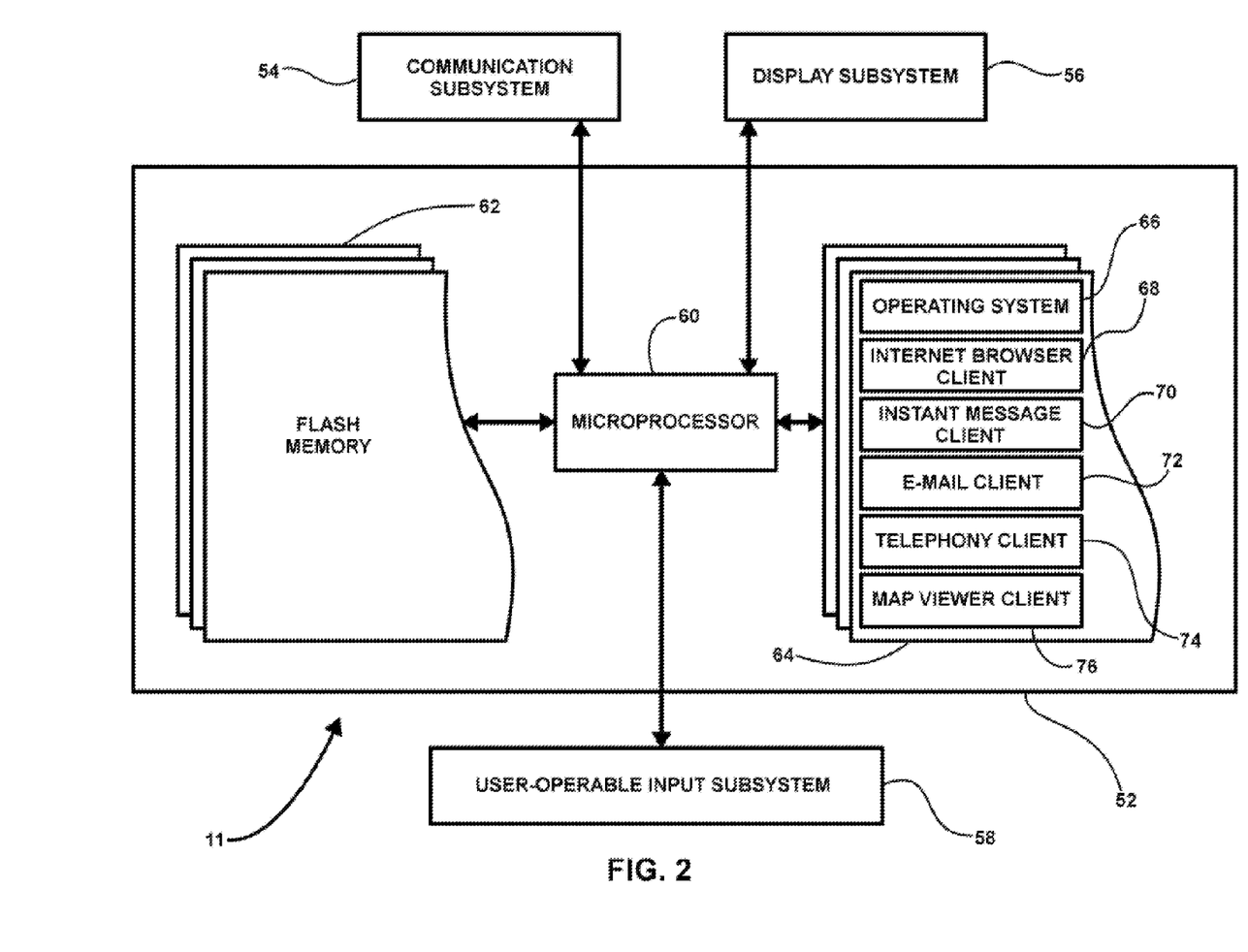
FIG. 2 is a schematic diagram of a mobile communications device of the communications system.

As shown in FIG. 2, the mobile communications device 11 may include a data processing system 52, a communication subsystem 54, a display subsystem 56, and a user-operable input subsystem 58 all disposed within a common housing. The communication subsystem 54 may include one or more radio transceivers and associated signal processing hardware and software to enable wireless communications with the PLMN 50 and/or one or more of the WLANs 32.

The data processing system 52 is in communication with the various device subsystems 54, 56, 58 and controls the overall operation of the mobile communications device 11. The data processing system 52 comprises a microprocessor 60, flash memory 62, and volatile memory (RAM) 64. The flash memory 62 includes computer processing instructions which, when executed by the microprocessor 60, implement an operating system 66, and various computer programs. Alternately, the computer processing instructions may be copied from the flash memory 62 into the RAM 64 upon system reset or power-up, and executed by the microprocessor 60 out of the RAM 64. The operator of the mobile communications device 11 uses the user-operable input subsystem 58 to provide manual input of data and/or commands to the data processing system 52, and to select, invoke, terminate and configure the operation of the operating system and the computer programs.

Typically, the computer programs include communication software clients that allow the mobile communications device 11 to receive one or more communications services. For instance, preferably the communication software clients includes an internet browser client 68, an instant message client 70, an e-mail client 72, a telephony client 74 and a map viewer client 76 that respectively allow the mobile communications device 11 to communicate with various computer servers over the Internet, send and receive messages/e-mail, initiate and receive telephone calls, and view electronic maps. The computer programs may also include application software (not shown), such as calendar software which diarizes due dates and/or appointments of importance to the user, and/or task management software which tracks the status of tasks of importance to the user.

The operating system 66 comprises a communication protocol stack that allows the mobile communications device 11 to send and receive information over the PLMN 50 and/or one or more of the WLANs 32 via the communication software clients.

The operating system 66 may also be configured to receive a services policy or "service book" that defines at least one restriction on the delivery of communications services to the mobile communications device 11, and to control the receipt of the communications services by allowing or inhibiting activation of the corresponding communication software clients in accordance with the restrictions identified in the services policy. Preferably, the services policy is pushed wirelessly to the mobile communications device 11, by an administrator of the enterprise network 20, via the PLMN 50 or the WLAN 32, and is stored in the flash memory 62.

Enterprise Network 20

The enterprise network 20 provides communications services to and typically connects to a number of networked servers, computers, and other devices. For example, the enterprise network 20 may connect to one or more personal (desktop/laptop) computers 15. The enterprise network 20 may connect to one or more digital telephone sets 17. The enterprise network 20 may also connect to one or more of the mobile communications devices 11 via the PLMN 50 and/or the WLANs.

Figure 3:
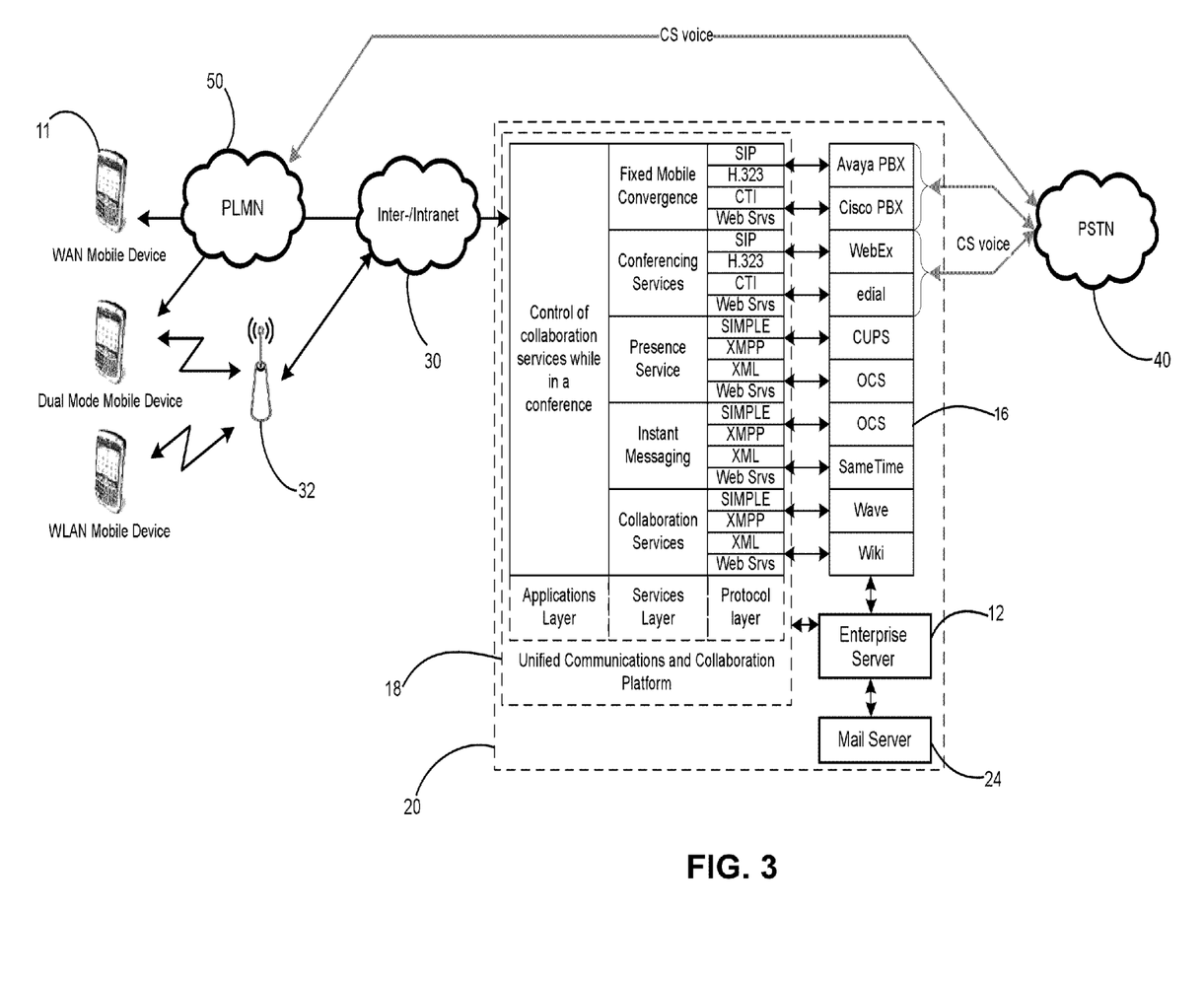
FIG. 3 is a schematic diagram depicting a communications services framework, and a unified communications and collaboration platform of communications services framework of the enterprise communications platform.

As shown in FIGS. 1 and 3, the enterprise network 20 may include an enterprise server 12, an enterprise communications platform 14, and one or more e-mail servers 24. The enterprise server 12 is configured to authenticate users with the enterprise network 20 prior to providing services to the user's mobile communications device 11 or personal computer 15. To do so, the enterprise server 12 maintains a credential database of user credentials, and may authenticate the user by comparing a unique identifier received from the mobile communications device 11 or personal computer 15 with a corresponding credential in the credential database.

The enterprise server 12, together with the relay 26, may also facilitate "push" e-mail service for the mobile communications device 11, enabling the user of the mobile communications device 11 to send and receive e-mail messages on the mobile communications device 11, at the user's e-mail address within the enterprise network 20, as though the user was connected to an e-mail server 24 within the enterprise network 20 via a personal computer 15. To do so, the enterprise server 12 may relay incoming e-mail messages (addressed to a user's e-mail address within the enterprise network 20) to the user's mobile communications device 11 (via the PLMN 50 or one of the WLANs) and to the e-mail server(s) 24, and may relay e-mail messages (received from one of the mobile communications devices 11 via the PLMN 50 or one of the WLANs, and addressed to an e-mail address external to the enterprise network 20) to the e-mail server(s) 24 and to the intended recipient within the WAN 30 or elsewhere. The e-mail servers 24 coordinate the transmission, storage, and receipt of electronic messages for the communications devices (mobile communications devices 11, personal computers 15) operating within the enterprise network 20.

The enterprise communications platform 14 may be implemented on one or more computer servers, and makes various "enterprise services" available to the mobile communications devices 11 (i.e. communications services normally only available within a fixed/wired network). To provide the enterprise services, preferably the enterprise communications platform 14 includes a communications services framework 16, and a Unified Communications and Collaboration Platform (UCCP) 18. The communications services framework 16 may make various communications services available to the enterprise network 20, such as enterprise telephony, conference call management, presence detection and notification, instant messaging, and collaboration services.

Communications Services Framework 16

To provide the foregoing communications services, the communications services framework 16 may include an Avaya PBX server and/or a Cisco PBX server, a Cisco WebEx conference server and/or an eDial conferencing server, a Cisco Unified Presence Service (CUPS) server, a Microsoft Office Communication Server (OCS) and/or an IBM/Lotus SameTime server, a Google Wave conversation server and/or a Wiki server, as shown in FIG. 3. The communications services framework 16 is not limited to this implementation, and may include servers other than or in addition to the foregoing servers.

In the embodiment of FIG. 3, the PBX servers route incoming and outgoing voice calls for the enterprise network 20. The PBX servers are connected to the PSTN 40 via DID trunks or PRI trunks, and may also be connected to one or more conventional analog telephones 19. The PBX servers may use ISDN signaling protocols for setting up and tearing down circuit-switched connections through the PSTN 40 and related signaling and communications. The PBX servers may also be connected to one or more digital telephone devices, such as the digital telephone sets 17, and/or softphones operating on the personal computers 15. Between the PBX servers and the PSTN 40, voice calls are typically circuit-switched. Between the PBX servers and the telephone terminal devices 15, 17, voice calls are often packet-switched, via Voice-over-IP (VoIP) for example.

In the embodiment of FIG. 3, the conference servers provide basic conference call services for the enterprise network 20, such as providing voice conferencing, video conferencing, in-conference text side-bars, and media mixing. The conference servers may provide conference management, such as controlling the joining and leaving of conferences, generating meeting notifications, and providing meeting recording and playback.

The conference servers may also maintain a default conference policy blueprint that defines default conference characteristics for all conferences provided by the conference server, such as conference duration and media type. The conference servers may allow users of the enterprise network 20 to modify the default meeting characteristics.

The OCS and SameTime servers provide instant message services for the enterprise network 20. The OCS and the CUPS may provide presence detection for conference and instant message sessions. The Wave and Wiki servers provide collaboration services for the enterprise network 20.

Unified Communications and Collaboration Platform 18

The Unified Communications and Collaboration Platform (UCCP) 18 performs messaging and session control, such as call control and advanced call processing, and also connects session legs and may provide the conversion between, for example, a circuit-switched call and a packet-switched call, or connect legs of other media sessions.

The UCCP 18 may be implemented on a stand-alone server or on multiple servers having suitable communications interfaces for connecting to and communicating with the communications services framework 16. Although the UCCP 18 may be implemented on a stand-alone server, the UCCP 18 may also be implemented as a logical software component within an existing control agent/server.

The UCCP 18 also provides enterprises services to the mobile communications devices 11 by managing and leveraging the delivery of the communications services provided by the communications services framework 16. In the example depicted in FIG. 3, the UCCP 18 provides fixed mobile convergence (FMC) enterprise telephony services to the mobile communications devices 11, thereby allowing the mobile communications device 11 to perform functions akin to those normally available on a standard office telephone, such as direct extension dialing, enterprise voice mail, conferencing, call transfer, call park, etc. The UCCP 18 may also provide a number of additional enterprise telephony services, including automated attendant, interactive voice response, call forwarding, voice mail, etc.

In addition to FMC, the UCCP 18 may allow the mobile communications device 11 to establish and/or participate in audio and video conference calls, instant message sessions, and collaboration services. The UCCP 18 may provide enterprise services other than, or in addition to, those identified above.

To provide the foregoing enterprise services, preferably the UCCP 18 is implemented as a multi-layer software platform that includes a protocol layer 34, a services layer 36 and an application layer 38.

The protocol layer 34 includes a plurality of interface procedures for interfacing the UCCP 18 with the communications services framework 16. As shown, the interface procedures may be configured to recognize Session Initiation Protocol (SIP), H.323, Computer Telephony Integration (CTI), Web Services, Session Initiation Protocol for Instant Messaging and Presence Leveraging Extensions (SIMPLE), Extensible Messaging and Presence Protocol (XMPP), and Extensible Markup Language (XML). The interface procedures may be implemented as plug-ins that interface directly with corresponding servers in the enterprise network 20. The UCCP 18 is not limited to this implementation, and may include interface procedures other than or in addition to the foregoing procedures.

SIP is the IETF (Internet Engineering Task Force) protocol used for establishing, maintaining, modifying and terminating voice and video call sessions between two or more endpoints. As defined in the SIP specification, a "call" is a communication between peers that is set up for the purposes of a multimedia conversation. A "session" is defined as a collection of participants, and the streams of media between them. The SIP protocol procedures interface with the PBX servers and the conference servers of the communications services framework 16, and are used by the enterprise communications platform 14 to set-up, manage, and tear-down media sessions for voice calls, and to provide basic conference call control.

H.323 is a standardized set of protocols relating to call signaling and control, and multimedia transport and control for the provision of multimedia communications over IP networks. The H.323 protocol procedures interface with the PBX servers and the conference servers of the communications services framework 16, and are used by the enterprise communications platform 14 to provide voice over IP (VoIP), and multimedia conferencing.

CTI is a technology that is used to co-ordinate interactions between computers and telephones. The CTI protocol procedures interface with the PBX servers and the conference servers of the communications services framework 16, and are used by the enterprise communications platform 14 to provide various call features, such as call display, call handling (e.g. call answer, hang-up, hold and conference), call routing (e.g. call transfer and call forwarding).

Web Services is a set of tools that use XML to make web-based applications available to a computer over an IP network, independent of the computer's operating system. The Web Services protocol procedures interface with the PBX servers and the conference servers of the communications services framework 16, and are used by the enterprise communications platform 14 to make web-based services from the WAN 30, available to the enterprise network 20.

SIMPLE is a family of SIP-based IETF specifications that facilitates instant message and the management of presence information. SIMPLE also includes a SIP extension that facilitates multi-party instant message sessions. The SIMPLE protocol procedures interface with the OCS and SameTime servers of the communications services framework 16, and are used by the enterprise communications platform 14 to manage instant message sessions, and to provide presence detection and notification services for conferences. The SIMPLE protocol procedures also interface with the Wave and Wiki servers, and are used by the enterprise communications platform 14 to provide collaboration services for the enterprise network 20.

XMPP is a standard XML-based protocol that provides instant message functions, presence information, and document transfer signaling. The XMPP protocol procedures interface with the CUPS and OCS servers of the communications services framework 16, and are used by the enterprise communications platform 14 to manage instant message sessions, and to provide presence detection. The XMPP protocol procedures also interface with the Wave and Wiki servers, and are used by the enterprise communications platform 14 to provide document collaboration services for the enterprise network 20.

The services layer 36 includes a plurality of service procedures that provide various services for the enterprise network 20. As shown, the services procedures may be configured to provide fixed mobile convergence (FMC) services, conference services, instant messaging services, presence services, and collaboration services. The UCCP 18 is not limited to this implementation, and may include service procedures other than or in addition to the foregoing procedures.

The FMC services procedure interfaces with the SIP, H.323, CTI and Web Services protocol procedures, and extends PBX functionality to the mobile communications devices 11. For instance, the FMC services procedure may provide voice call handling (e.g. call answer, hang-up, hold and conference) of circuit-switched and packet-switched voice calls. The FMC services procedure may provide call display, voice-mail, and multimedia conferencing, and may also provide call routing services (e.g. call transfer and call forwarding) so that a user of a mobile communications device 11 can receive and originate calls on the mobile communications device 11 in the same fashion is if the call was received or originated at one of the personal computers 15.

The conference services procedure interfaces with the SIP, H.323, CTI and Web Services protocol procedures, and extends advanced voice and multimedia conferencing functionality to the mobile communications devices 11. For instance, the conferencing services procedure may implement floor control and moderation, may provide notifications to the conference participants as the state of the conference changes, and may control the media type allowed for each conference participant.

The instant message services procedure interfaces with the Web Services, SIMPLE, XMPP, and XML protocol procedures, and extends advanced instant message functionality to the mobile communications devices 11. For instance, the instant message services procedure may provide meeting invite notification, and meeting participant availability monitoring and notification. The instant message services procedure may also facilitate web link redirection from instant messages having embedded web links, and call origination from instant messages having embedded phone links.

The presence services procedure interfaces with the Web Services, SIMPLE, XMPP, and XML protocol procedures, and provides presence notification to the conferencing services procedure and/or the instant message procedure, to thereby extend presence detection services to the mobile communications devices 11. For instance, the presence services procedure may notify the conferencing services procedure when a conference participant has connected to or disconnected from a conference. The presence services procedure may notify the instant message services procedure when an instant message user is available or unavailable to participate in an instant message session.

The collaboration services procedure interfaces with the Web Services, SIMPLE, XMPP, and XML protocol procedures, and extends collaboration functionality to the mobile communications devices 11. For instance, the collaboration services procedure may facilitate transmission and presentation of collaborative documents to the mobile communications devices 11. The collaboration services procedure may also facilitate editing of collaborative documents at the mobile communications devices 11.

The application layer 38 interfaces with the services layer 36, and manages the delivery of the enterprise services for the enterprise network 20. The application layer 38 maintains a services policy defines at least one service restriction on the delivery of the enterprise services. Two classes of service restrictions are contemplated. The service policy may specify the enterprise services (if any) that the enterprise network 20 is authorized to provide while delivering another enterprise service. The services policy may specify one or more limitations on the scope of the authorized enterprise service.

The application layer 38 may maintain a single default services policy blueprint which defines default service restrictions common to all of the enterprise services. Alternately, the application layer 38 may maintain default services policy blueprints for each of the enterprise services, which allows the enterprise network administrator to define respective default service restrictions for each of the enterprise services. The application layer 38 may allow users of the enterprise network 20 to modify the default service restrictions, based on their user's account permissions.

The following list provides several examples of the service restrictions that the services policy may impose on the delivery of enterprise services to users of the enterprise network 20:

prohibit participants to any or certain specified communications sessions from receiving "out-of-band" communications services (i.e. communications services provided by other than the server providing the communications session) for the duration of the session (e.g. prohibit participants to a voice call session or an instant message session from participating in any other communications session for the duration of the voice call or instant message session; prohibit participants to a voice or video conference from receiving voice call services, instant message services, and/or collaborative services for the duration of the conference, other than those provided by the conference server)

prohibit participants to any or certain specified communications sessions from receiving any "out-of-band" communications services for the duration of the session, except for certain specified "out-of-band" communications services provide the communications sessions only to the authorized participants allow participants to certain specified communications sessions to only engage in "out-of-band" communications with the other participants of the communications session, for the duration of the session (e.g. allow participants to a voice and/or video conference to only engage in out-of-band voice call sessions, instant message sessions and/or collaborative service sessions with the other conference participants, for the duration of the conference)

allow participants to certain specified communications sessions to engage in "out-of-band" communications only with users who are other than participants of the communications session, for the duration of the session (e.g. allow participants to a voice and/or video conference to engage in out-of-band voice call sessions, instant message sessions and/or collaborative service sessions only with users who are not conference participants, for the duration of the conference)

require out-of-band communications to be recorded during a communications session (e.g. record all voice call sessions, instant message sessions and/or collaborative service sessions of all the conference participants during a voice and/or video conference)

specify the participants to a communications session whose out-of-band communications must be recorded during the session block or prohibit international voice calls or 1-900 voice calls for the duration of a conference call The services policy may impose service restrictions other than, or in addition to, those identified above. Moreover, the services policy may be fixed by the administrator of the enterprise communications platform 14. Alternately, the services policy may be defined by the users of the enterprise network 20 prior to delivery of a particular enterprise service.

Operation of Communication System 10

(i) Management of Communications Services

Figure 4:
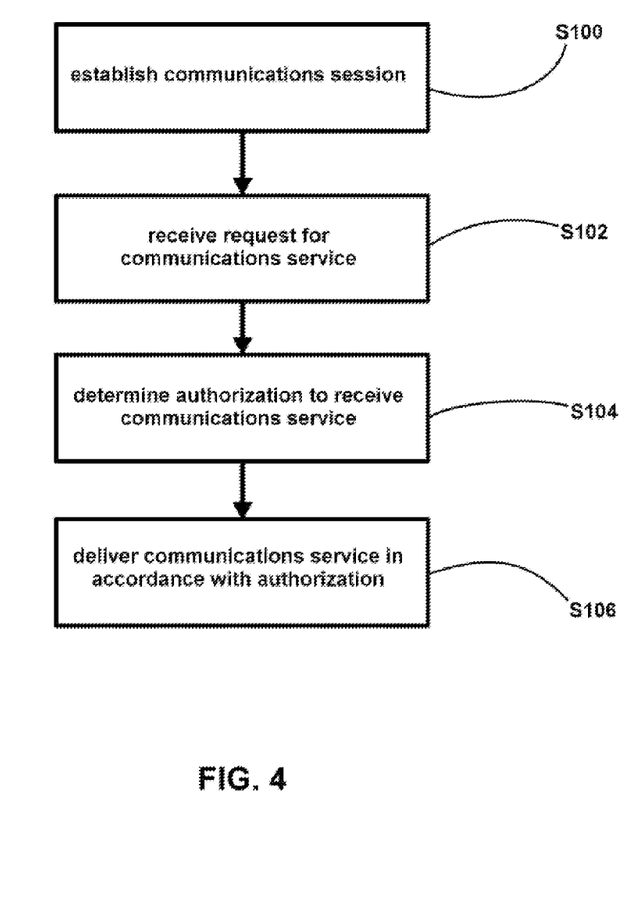
FIG. 4 is a signaling diagram that depicts, by way of overview, a method of managing communications services using a services policy.

The method of managing communications services using the communication system 10 will now be discussed, by way of overview, with reference to FIG. 4. At step S100, a server of the enterprise network 20 and a communications device maintain a communications session with each other. The communications device may be one of the mobile communications devices 11, personal computers 15, or digital telephone sets 17.

At step S102, the enterprise network 20 may receive a request for a communications service. The request may be received from the communications device with which the enterprise network 20 is currently maintaining the communications session, or may be received from a different communications device.

Alternately, at step S102, the communications device may receive the request for the communications service. In this variation, the request may be received from an operator of the communications device with which the enterprise network 20 is currently maintaining the communications session, or may be received from a different communications device.

If the communications service requested is deliverable by the server that is maintaining the communications session with the communications device, the server determines whether the communications device (which the enterprise network 20 is currently maintaining the communications session) is authorized to also receive the requested communications service.

However, if the communications service requested is deliverable by a source other than the server that is maintaining the communications session with the communications device, an authorization of the communications device (with which the enterprise network 20 is currently maintaining the communications session) to receive the requested communications service is determined at step S104. The authorization comprises a permission of the communications device to receive the communications service during a lifetime of the communications session. The authorization may be determined by the enterprise network 20 or by the communications device that received the request for the communications service.

If the authorization is denied, the enterprise network 20 does not deliver the requested communications service. However, if the authorization is granted and was determined by the enterprise network 20, at step S106 the enterprise network 20 delivers the communications service to the communications device while continuing to maintain the communications session with the communications device. Alternately, if the authorization is granted but was determined by the communications device (with which the enterprise network 20 is currently maintaining the communications session), the communications device transmits to the enterprise network 20 a request for the communications service, and at step S106 the communications device receives the communications service while continuing to maintain the communications session.

Figure 5A:
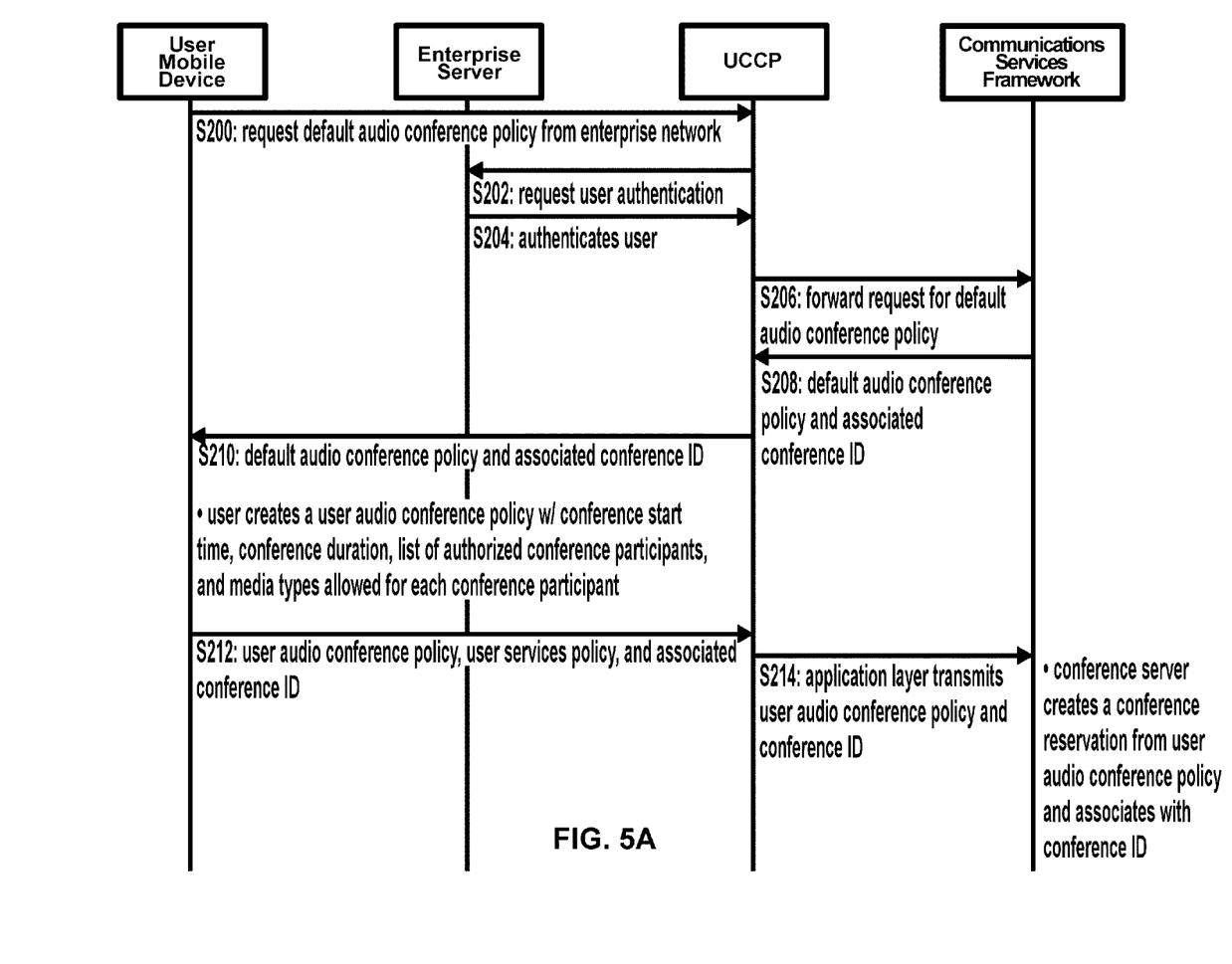
FIGS. 5a and 5b together comprise a detailed signaling diagram that depicts a method of managing communications services using a services policy enforced by the enterprise communications platform.
Figure 5B:
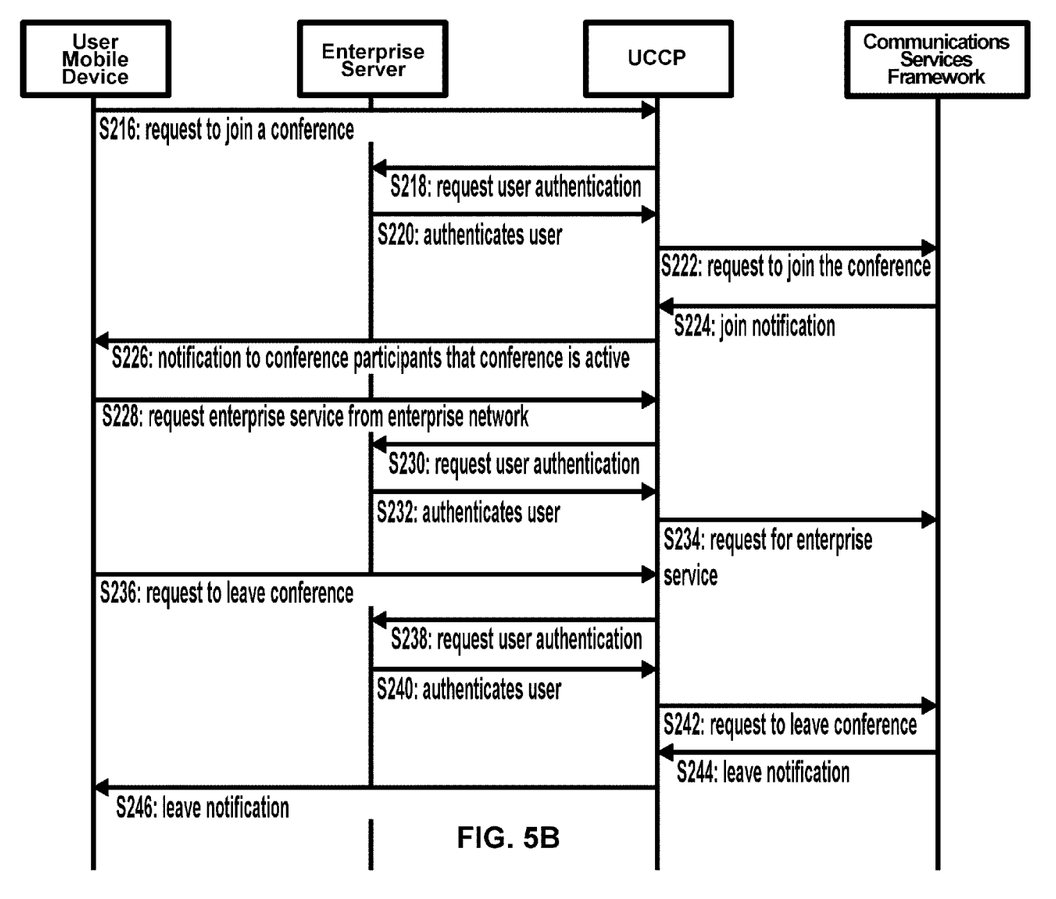
Figure 6A:
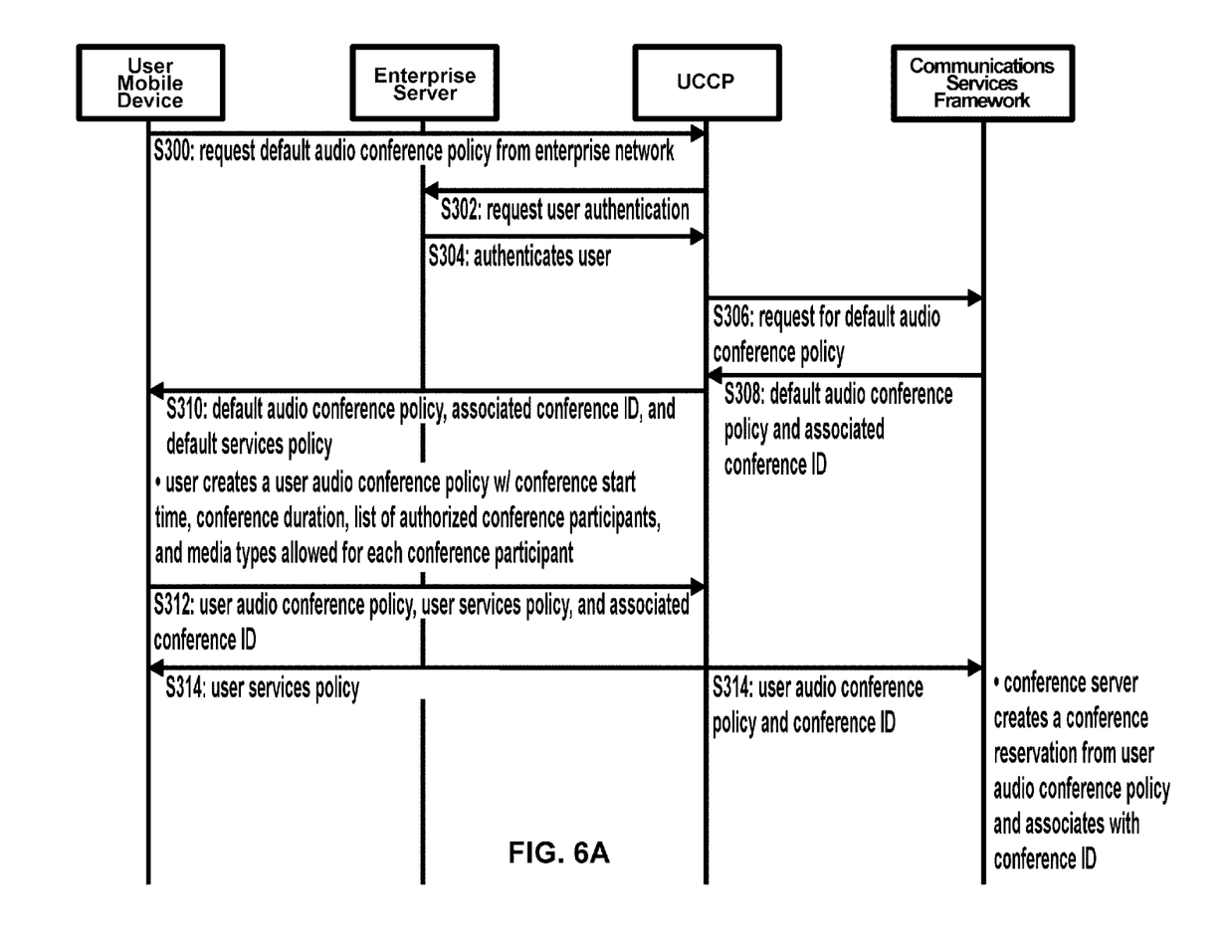
FIGS. 6a and 6b together comprise a detailed signaling diagram that depicts a method of managing communications services using a services policy enforced by the mobile communications device.
Figure 6B:
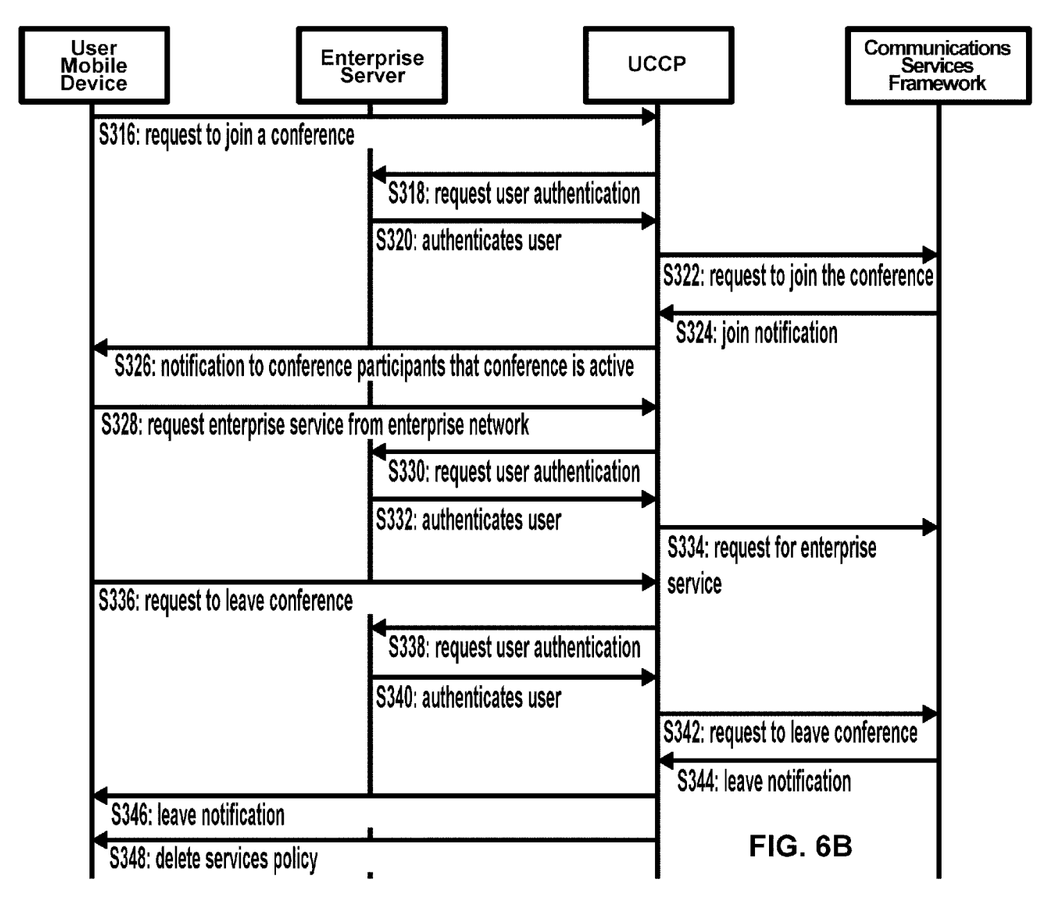

Two sample embodiments of the foregoing method will now be discussed with reference to FIGS. 5a, 5b, 6a and 6b. In the embodiment of FIGS. 5a and 5b, the enterprise network 20 determines the authorization from a services policy that is enforced by the enterprise network 20. In the embodiment of FIGS. 6a and 6b, a communications device determines the authorization from a services policy that is enforced by the communications device.

The following discussions assume that the services policy manages the delivery of "out-of-band" communications services while a conference call is active. Further, the reservation of the conference and the subsequent request for additional enterprise services is initiated by the mobile communications devices 11. However, it should be understood that the operation of the communication system 10 is not limited to this example configuration, and that one or more of the following steps may be performed by one of the personal computers 15, and that the services policy may be used in association with enterprise services other than a conference call.

(ii) Enterprise-Enforced Services Policy

Turning to the embodiment depicted in FIGS. 5a and 5b, a user of the enterprise network 20 issues a request to the enterprise network 20 for a default audio conference policy, at step S200. At step S202, the UCCP 18 forwards the request to the enterprise server 12 for user authentication. The enterprise server 12 authenticates the user by comparing a credential received from the user's mobile communications device 11 against the credential database, and providing the UCCP 18 with a validation response, at step S204. If the user is authenticated, at step S206 the UCCP 18 forwards to the communications services framework 16 the request for the default audio conference policy.

At step S208, a conference server of the communications services framework 16 creates a conference ID, creates a copy of the default audio conference policy blueprint, and forwards the copy (default audio conference policy), and the associated conference ID, to the UCCP 18 for transmission to the user's mobile communications device 11. The application layer 38 of UCCP 18 determines whether the user is authorized to define a user services policy. If the user is authorized to define a user services policy, at step S210 the application layer 38 creates a copy of the default services policy blueprint, and causes the copy (default services policy) and the default audio conference policy to be transmitted to the user's mobile communications device 11 together with the conference ID. Otherwise, at step S210 the application layer 38 causes the default audio conference policy to be transmitted to the user's mobile communications device 11 together with the conference ID (without a default services policy).

Upon receipt of the default audio conference policy, the user uses its mobile communications device 11 to create a user audio conference policy by inserting into the appropriate fields of the default audio conference policy, the conference start time, conference duration, list of authorized conference participants, and the media types allowed for each conference participant. Upon receipt of the default services policy (if provided), the user uses its mobile communications device 11 to create a user services policy by modifying the default service restrictions, specified in the default services policy, that will apply for the duration of the audio conference.

At step S212, the user transmits the user audio conference policy, the user services policy (if available), and the associated conference ID to the UCCP 18. The application layer 38 maintains a copy of the user services policy, and associates the user services policy with the conference ID. Alternately, if the user was not authorized to define a user services policy, the application layer 38 associates the default services policy with the conference ID.

The application layer 38 transmits the user audio conference policy and the conference ID to the communications services framework 16, at step S214. One of the conference servers creates a conference reservation from the received user audio conference policy, and associates the conference reservation with the conference ID. The application layer 38 thereafter manages the delivery of the audio conference to the conference participants.

The user may then provide the conference information, including the conference ID, to the conference participants. At step S216, a prospective conference participant might issue a request (which includes the conference ID) to the enterprise network 20 to join the conference. At step S218, the UCCP 18 forwards the request to the enterprise server 12 for user authentication. The enterprise server 12 authenticates the prospective conference participant by comparing a credential received from the mobile communications device 11 of the prospective conference participant against the credential database, and providing the UCCP 18 with a validation response, at step S220. If the prospective conference participant is authenticated, at step S222 the UCCP 18 forwards to the communications services framework 16 the request to join the audio conference.

The conference server determines from the user audio conference policy whether the prospective conference participant is an authorized conference participant. If the prospective conference participant is an authorized conference participant, at step S224 the conference server transmits to the application layer 38, via the conferencing services procedure, a join notification that indicates that the conference (having the specified conference ID) is active and identifies the authorized conference participants an active conference participant. The application layer 38 associates with the user services policy (or the default services policy) the active conference participant, and thereby maintains a list of active conference participants.

At step S226, the application layer 38 causes a notification to be transmitted to the communications devices of the other conference participants (as listed in the conference policy) that indicates that the conference is active and identifies the active conference participant. Steps S216 to S226 are repeated as each prospective conference participant requests to join the conference.

One of the active conference participants might then activate one of the communication software clients on the user's mobile communications device 11 for the purpose of receiving another one of the enterprise services while the conference is still active. For instance, the conference participant may invoke the instant message client on the mobile communications device 11 of the conference participant, thereby attempting to initiate or otherwise participate in an instant message session with a specified user. At step S228, the communication software client on the mobile communications device 11 issues a request to the enterprise network 20 for the other enterprise service (e.g. instant message service).

At step S230, the UCCP 18 forwards the request to the enterprise server 12 for user authentication. The enterprise server 12 authenticates the conference participant by comparing a credential received from the mobile communications device 11 of the conference participant against the credential database, and providing the UCCP 18 with a validation response, at step S232. If the conference participant that initiated the request for the other enterprise service is authenticated, the application layer 38 determines whether the active conference participant is currently associated with a user services policy or the default services policy (step S212). If the conference participant is not currently associated with a user services policy or the default services policy, the application layer 38 transmits to the communications services framework 16 a request for the requested enterprise service. However, if the conference participant is currently associated with a user services policy or the default services policy, the application layer determines whether the services policy permits delivery of the requested enterprise service during the audio conference, and whether delivery of the requested enterprise service to the specified user is permitted.

If delivery of the requested enterprise service during the audio conference is not permitted, or delivery of the requested enterprise service during the audio conference to the specified user is not permitted, the application layer 38 denies the request and may cause a notification to be transmitted to the mobile communications device 11 of the conference participant that indicates that the requested enterprise service is denied. However, if delivery of the requested enterprise service to the specified user during the audio conference is permitted, at step S234 the application layer 38 transmits to the communications services framework 16 a request for the requested enterprise service. The application layer 38 thereafter manages the delivery of the requested enterprise service to the intended recipients.

After the conference is active, at step S236 one of the active conference participants might issue a request (which includes the conference ID) to the enterprise network 20 to leave the conference. At step S238, the UCCP 18 forwards the request to the enterprise server 12 for user authentication. The enterprise server 12 authenticates the conference participant by comparing a credential received from the mobile communications device 11 of the conference participant against the credential database, and providing the UCCP 18 with a validation response, at step S240. If the conference participant is authenticated, at step S242 the UCCP 18 forwards to the communications services framework 16 the request to leave the audio conference.

At step S244 the conference server transmits to the application layer 38, via the conferencing services procedure, a conference notification that identifies the conference participant who has left the conference. At step S246, the application layer 38 causes a notification to be transmitted to the communications devices of the other conference participants that indicates that the specified conference participant has left the conference. Steps S236 and S246 are repeated as each conference participant requests to leave the conference.

At the end of the conference, after all of the conference participants have left the conference, the application layer 38 deletes the user services policy, and the association to the conference ID, thereby removing the service restrictions imposed by the user services policy.

(iii) Communications Device-Enforced Services Policy

Turning to the embodiment depicted in FIGS. 6a and 6b, at steps S300 to S310 the user creates a user conference policy and a user services policy, as described above with reference to steps S200 to S210 of FIG. 5a.

At step S312 the user transmits the user audio conference policy, the user services policy (if available), and the associated conference ID to the UCCP 18; and the application layer 38 associates the user services policy with the conference ID, as described above with reference to step S212. Alternately, if the user was not authorized to define a user services policy, the application layer 38 associates the default services policy with the conference ID. The application layer 38 causes a copy of the services policy to be transmitted to the communications devices of all the conference participants, at step S314. Preferably, the communications device of each of the conference participants saves a copy of the services policy.

The application layer 38 also transmits the user audio conference policy and the conference ID to the communications services framework 16. One of the conference servers creates a conference reservation from the received user audio conference policy, and associates the conference reservation with the conference ID. The application layer 38 thereafter manages the delivery of the audio conference to the conference participants. The user may provide the conference information, including the conference ID, to the conference participants.

At steps S316 to S326, prospective conference participants join the conference, as described above with reference to steps S216 to S226. One of the active conference participants might then activate one of the communication software clients on the mobile communications device 11 of the conference participant for the purpose of receiving another one of the enterprise services while the conference is still active. The mobile communications device 11 determines whether it has a saved services policy. If the mobile communications device 11 does not have a saved services policy, the communication software client on the mobile communications device 11 issues a request to the enterprise network 20 for the other enterprise service. However, if the mobile communications device 11 has a saved services policy, the mobile communications device 11 determines whether the services policy permits delivery of the requested enterprise service during the audio conference, and whether delivery of the requested enterprise service to the specified user is permitted.

If delivery of the requested enterprise service during the audio conference is not permitted, or delivery of the requested enterprise service during the audio conference to the specified user is not permitted, the mobile communications device 11 notifies the conference participant that the requested enterprise service is denied. However, if delivery of the requested enterprise service to the specified user during the audio conference is permitted, at step S328 the communication software client on the mobile communications device 11 of the active conference participant issues a request to the enterprise network 20 for the other enterprise service.

At step S330, the UCCP 18 forwards the request to the enterprise server 12 for user authentication. The enterprise server 12 authenticates the conference participant by comparing a credential received from the mobile communications device 11 of the conference participant against the credential database, and providing the UCCP 18 with a validation response, at step S332. If the conference participant that initiated the request for the other enterprise service is authenticated, at step S334 the application layer 38 transmits to the communications services framework 16 a request for the requested enterprise service. The application layer 38 thereafter manages the delivery of the requested enterprise service to the intended recipients.

At steps S336 to S348, users leave the conference, as described above with reference to steps S236 to S246. At the end of the conference, after all of the conference participants have left the conference, the application layer 38 causes a service policy delete command to be transmitted to the communications devices of all the conference participants, at step S348. In response, the communications device of each of the conference participants deletes the user services policy, thereby removing the service restrictions imposed by the user services policy.

Alternately, in one variation of this second embodiment, the user services policy has a lifespan, which may be equal to the duration of the conference, as defined in the user audio conference policy. In another variation of this second embodiment, where the expected duration of the communications session is not defined in the user conference policy (e.g. instant message session), the lifespan of the user services policy is short (e.g. 5 minutes) and the application layer 38 periodically pushes a copy of the services policy to the communications devices to the participants of the communications session until the communications session is terminated. In both variations, the communication software client on the communications device issues a request to the enterprise network 20 for the other enterprise service, at step S328, only after verifying that the user services policy has not expired.

In this second embodiment, the services policy is enforced by the communications devices. Again, however, this configuration is not essential. Rather, some aspects of the services policy may be enforced by the communications device, while other aspects may be enforced by the UCCP 18.

The invention claimed is:

1. A method of managing communications services, comprising:
maintaining, by a communications services framework of a communications platform, a conference call having a communications session;
receiving, at a unified communications and collaboration platform component of the communications platform, a request from a communications device, with which the communications platform is maintaining the communication session, for a communications service to be provided to the communications device by a source other than the communications platform;
determining, by the unified communications and collaboration platform component, an authorization of the communications device to receive the communications service, the authorization comprising a permission of the communications device to receive the communications service during a lifetime of the communications session maintained with the communications device; and
in accordance with the authorization, authorizing, at the unified communications and collaboration platform component, delivery of the communications service to the communications device during the lifetime of the communications session.

2. The method according to claim 1, wherein the determination of the authorization is based on a service policy that defines a service restriction on the delivering of communications services, wherein the services policy is maintained by the communications platform.

3. The method according to claim 2, wherein the services policy specifies at least one communications service the communications platform is authorized to provide while maintaining the communications session.

4. The method according to claim 3, wherein the services policy specifies a limitation on the scope of the at least one communications service.

5. The method according to claim 2, wherein the services policy prohibits participants to the communications session from receiving the communications services for the duration of the communications session.

6. The method according to claim 2, wherein the services policy allows participants to the communications session to receive the communications services for the duration of the communications session.

7. The method according to claim 6, wherein the services policy only allows each participant to the communications session to communicate with the other participants of the communications session.

8. The method according to claim 6, wherein the services policy only allows each participant to the communications session to communicate with other than the participants of the communications session.

9. The method according to claim 6, wherein the services policy requires the communications services to be recorded for the duration of the communications session.

10. The method according to claim 9, wherein the recorded communications services comprise only the communications of the participants specified by the services policy.

11. A communications platform comprising:
a communications services framework configured to maintain a communications session with a communications device; and
a unified communications and collaboration platform in communication with the communications services framework, the unified communications and collaboration platform being configured to determine an authorization of the communications device to receive a communications service, the communications service being deliverable by a source other than the communications platform, the authorization comprising a permission of the communications device to receive the communications service during a lifetime of the communications session,
wherein the communications platform is configured to authorize delivery of the communications service to the communications device during the lifetime of the communications session, in accordance with the authorization.

12. The communications platform according to claim 11, wherein the communications platform maintains a services policy that defines a service restriction on the delivering of communications services, and is configured to determine the authorization from the services policy.

* * * * *